(12) United States Patent
Jain et al.

(10) Patent No.: US 9,641,968 B2
(45) Date of Patent: May 2, 2017

(54) SHARING MOMENT EXPERIENCES

(71) Applicant: Krumbs, Inc., Irvine, CA (US)

(72) Inventors: Neilesh Jain, Irvine, CA (US); Ramesh Jain, Irvine, CA (US); Pinaki Sinha, San Jose, CA (US)

(73) Assignee: Krumbs, Inc., Irvine, CA (US)

( * ) Notice: Subject to any disclaimer, the term of this patent is extended or adjusted under 35 U.S.C. 154(b) by 0 days.

(21) Appl. No.: 14/713,101

(22) Filed: May 15, 2015

(65) Prior Publication Data

US 2015/0334529 A1  Nov. 19, 2015

Related U.S. Application Data

(60) Provisional application No. 61/994,326, filed on May 16, 2014.

(51) Int. Cl.

| | |
|---|---|
| *H04W 24/00* | (2009.01) |
| *H04W 4/02* | (2009.01) |
| *G06F 3/048* | (2013.01) |
| *H04W 4/12* | (2009.01) |
| *G06Q 50/00* | (2012.01) |

(52) U.S. Cl.
CPC .............. *H04W 4/02* (2013.01); *G06F 3/048* (2013.01); *G06Q 50/01* (2013.01); *H04W 4/025* (2013.01); *H04W 4/12* (2013.01)

(58) Field of Classification Search
CPC ............... G06F 19/322; G06F 19/3418; G06F 19/3487; G06F 19/3406; G06F 19/3456; G06F 19/34; G06F 1/1626; G06F 1/163; G06F 21/602; G06F 3/04883; G06Q 50/22; G06Q 50/24; G06Q 20/18; H04W 88/06; H04W 64/00; H04L 67/10; H04L 2209/805; H04L 67/12; H04L 67/18; H04L 63/0861; H04L 41/0681; H04M 11/04; H04M 2207/20; H04M 2242/04; H04M 2242/30; H04M 1/72533; G08B 21/0446; G08B 21/0453; G08B 21/22

See application file for complete search history.

(56) References Cited

U.S. PATENT DOCUMENTS

2013/0006634 A1* 1/2013 Grokop .................. G10L 17/10
704/245

* cited by examiner

*Primary Examiner* — Nimesh Patel
(74) *Attorney, Agent, or Firm* — Dergosits & Noah LLP; Todd A. Noah

(57) ABSTRACT

A system for sharing moment experiences is described. A system receives moment data from an input to a mobile device. The system receives geographic location information, time information, and contextual information that is local to the mobile device. The system creates a message about the moment data based on the geographic location information, the time information, and the contextual information. The system outputs the moment data with the message.

17 Claims, 3 Drawing Sheets

SHARING MOMENT EXPERIENCES

CLAIM OF PRIORITY

This application claims the benefit of U.S. Provisional Patent Application No. 61/994,326, filed May 16, 2014, the entire contents of which are incorporated herein by reference.

BACKGROUND

Smartphone users have become accustomed to spontaneously sharing their experiences almost instantaneously via messaging platforms, emails, and social networks. Initially such sharing was done using text, such as "at Chargers' game," "tasty food," and "wish you were here." Then sharing began to include still images, such as photographs, which smartphone users often annotated with text. Although sharing of experiences has gone beyond text and still images to include video recordings and audio recordings, text and images remain the two dominant modes for sharing experiences.

DETAILED DESCRIPTION

Embodiments herein enable sharing moment experiences. Moment data is received from an input to a mobile device. Geographic location information, time information, and contextual information that is local to the mobile device is received. A message is created about the moment data based on the geographic location information, the time information, and the contextual information. The moment data is output with the message.

For example, a smartphone's moment experience system receives a photograph taken by the smartphone's digital camera at a party. The smartphone's moment experience system receives time information identifying the date and time as 9:00 PM Saturday May $9^{th}$ from the smartphone's clock, receives contextual information from the smartphone's accelerometer which indicates that the smartphone's user is dancing, and receives contextual information identifying a calendar entry for attending Jane's birthday party at 9:00 P.M. on May $9^{th}$ from the smartphone's calendar application. The smartphone's moment experience system creates the message "Dancing at Jane's birthday party!" describing the photograph based on the time information from the smartphone's clock and the contextual information from the smartphone's accelerometer and calendar application. The smartphone's moment experience system outputs the photograph taken at the party and the message "Dancing at Jane's birthday party!" to the social network friends of the smartphone's user. The smartphone's user did not have to spend any time entering a message to describe the photograph as taken at Jane's birthday party.

Figure 1:
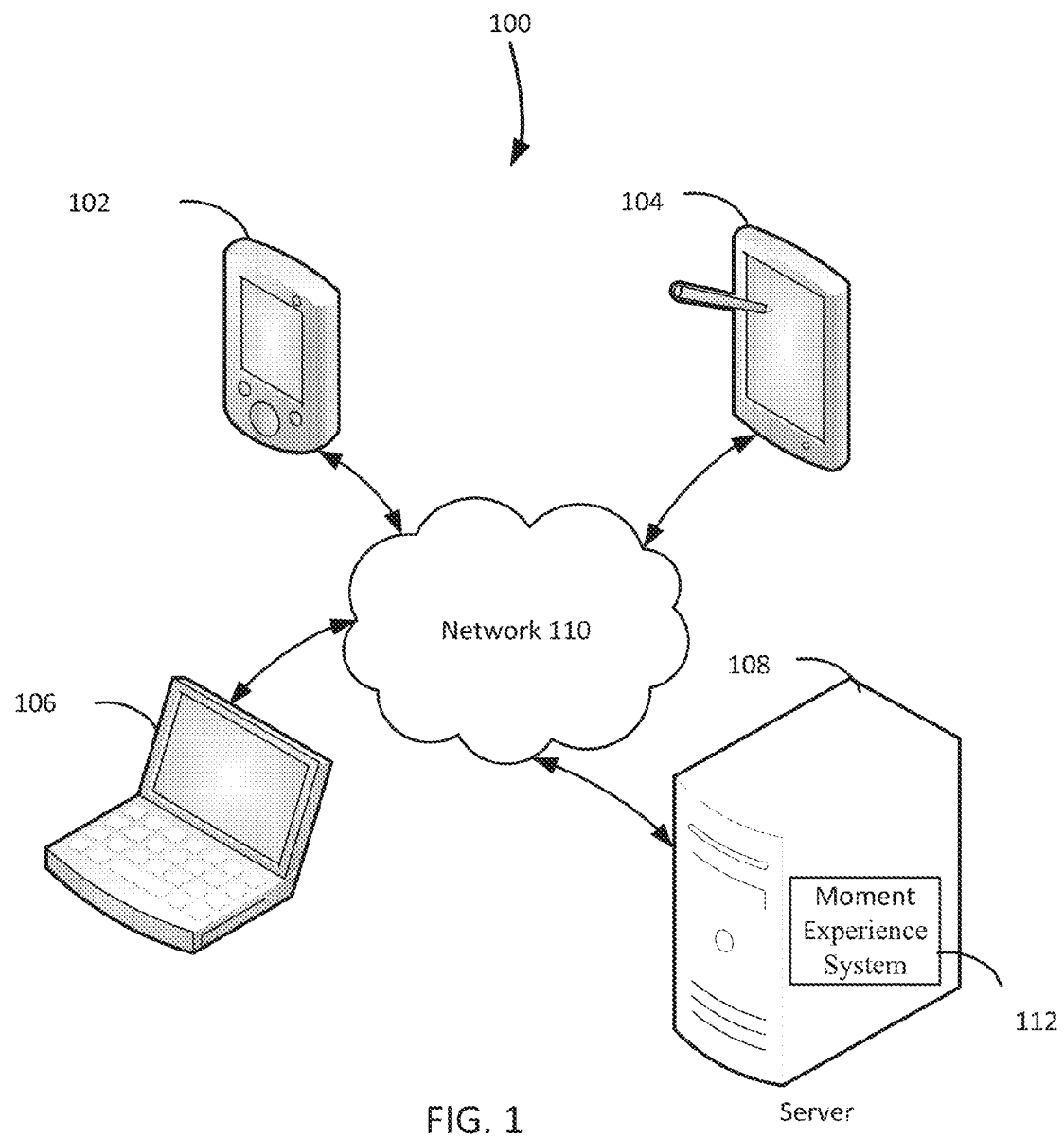
FIG. 1 illustrates a block diagram of an example system for sharing moment experiences, under an embodiment.

FIG. 1 illustrates a block diagram of an example system 100 for sharing moment experiences, under an embodiment.

As shown in FIG. 1, the system 100 may illustrate a cloud computing environment in which data, applications, services, and other resources are stored and delivered through shared data-centers and appear as a single point of access for the end users. The system 100 may also represent any other type of distributed computer network environment in which servers control the storage and distribution of resources and services for different client users.

In an embodiment, the system 100 represents a cloud computing system that includes a first mobile device 102, a second mobile device 104, and a third mobile device 106; and a computer 108 that may be provided by a hosting company. The mobile devices 102-106 and the computer 108 communicate via a network 110. Although FIG. 1 depicts the system 100 with three mobile devices 102-106, one computer 108, and one network 110, the system 100 may include any number of mobile devices 102-106, any number of computers 108, and any number of networks 110. Further, although FIG. 1 depicts first mobile device 102 as a smartphone 102, the second mobile device 104 as a tablet computer 104, the third mobile device 106 as a laptop computer 106, and the computer 108 as a server 108, each of the system components 102-108 may be any type of computer system. For example, any of the mobile devices 102-106 may be a mobile phone, a tablet computer, a laptop computer, a portable computer, a wearable computer, a dual mode handset, a dual subscriber identification module phone, a wireless mobile device, a pager, a personal assistant, a digital video player, a digital camera, a digital music player, a digital calculator, and/or an electronic key fob for keyless entry. The system elements 102-108 may each be substantially similar to the hardware device 300 depicted in FIG. 3 and described below. Although FIG. 1 depicts a moment experience system 112 residing on the computer 108, the moment experience system 112 may reside on any or all of the system elements 102-108.

Each of the mobile devices 102-106 may include a digital camera, an audio input, a touchscreen, a keyboard, a touchpad, and/or a mouse input device to input moment data. For example, the moment experience system 112 residing on the smartphone 102 receives a photograph taken by the smartphone's digital camera at a party. Alternatively, the moment experience system 112 residing on the server 108 may receive a photograph taken by the smartphone's digital camera from the smartphone 102. Although these preceding examples describe moment data as a photograph, the moment data may be any data captured at any moment(s) in time to record an experience of a mobile device user, such as a video recording, an audio recording, or the text "having a blast!" entered via a touch screen, a keyboard, a touchpad, or a mouse input device. Additionally, the moment experience system 112 may convert speech from audio input into text to facilitate sharing moment experiences.

Each of the mobile devices 102-106 may include a geographic location sensor to create geographic location information, and a clock to create time information. Each of the mobile devices 102-106 may also include an accelerometer, an electronic gyroscope, a barometer, a galvanic skin response sensor, a heart rate monitor, a skin temperature sensor, a respiration rate sensor, a piezoelectric pulse wave blood pressure sensor, a skin conductivity sensor, a camera parameter sensor (exposure, focal length, f-number, ISO, etc), and/or a software application to create contextual information. For example, the moment experience system 112 residing on the smartphone 102 receives time information identifying the date and time as 9:00 PM Saturday May $9^{th}$ from the clock residing on the smartphone 102, receives contextual information from the accelerometer residing on the smartphone 102 which indicates that the smartphone's user is dancing, and receives contextual information identifying a calendar entry for attending Jane's birthday party at 9:00 P.M. on May 9*th* from the calendar application residing on the smartphone 102. Alternatively, the moment experience system 112 residing on the server 108 may receive the information from the clock, the accelerometer, and the calendar application residing on the smartphone 102 via the smartphone 102.

The moment experience system 112 may clean up noise in the contextual information, associate the contextual information with corresponding moment data, and integrate contextual information to create a more holistic view of a moment experienced. The accelerometer may infer the activity of a mobile device user, such as sitting, standing, walking, running, driving, dancing, etc. The electronic gyroscope may measure the orientation and rotational movement of a mobile device user. The barometer may measure the elevation of a mobile device user above sea level. Physiological sensors, such as the heart rate monitor, the skin temperature sensor, the galvanic skin response (electrodermal activity) sensor, the respiration rate sensor, the piezo-electric pulse wave blood pressure sensor, and the skin conductivity sensor generate contextual information that may be used to infer the mental and physical state of a mobile device user. Such contextual information can infer various types of emotions like relaxed, surprised, happy, ecstatic, anger, stress, and sadness that may be associated with a moment. The moment experience system 112 may cache some of the contextual information, rather than querying contextual information every moment, thereby decreasing the latency, improving the throughput, and improving the battery life of the corresponding mobile device.

After receiving geographic location information, time information, and contextual information, the moment experience system 112 may derive a value associated with the moment data, the geographic location information, the time information, and/or the contextual information. For example, the moment experience system 112 residing on the smartphone 102 uses derived values from facial detection and recognition software to identify Tim in the photograph, and uses the information from the smartphone's geographic location sensor combined with derived values from reverse geocoding information to identify the location of Jane's birthday party as Joe's Bar & Grill. Alternatively, the moment experience system 112 residing on the server 108 identifies Tim in the photograph and identifies the location of Jane's birthday party as Joe's Bar & Grill based on values derived from the moment data, the geographic location information, the time information, and/or the contextual information. The moment experience system 112 may be able to select the best source of information when specific information is available from multiple sources, such as selecting the best reverse geocoding information from multiple sources of reverse geocoding information. The moment experience system 112 may also use an optical character recognition system to read text that can be used as a derived value. For example, the moment experience system 112 reads the nametag "Tim" in the photograph to identify Tim in the photograph because the facial recognition software was unable to identify beyond the required threshold level whether Tim was in the photograph.

A value may be derived from information sources that provide reverse geocoding information and the current conditions in which the moment data has been captured, such as the weather at the current location, current traffic, an event occurring at a location, and the event's status. The moment experience system 112 can use time combined with a geographic location to infer sunrise, sunset, full-moon, etc. The moment experience system 112 can use generic knowledge sources like ontologies to identify moment data associated with an event. For example, if an event is a birthday party, a wedding, a graduation, or an anniversary, the moment experience system 112 can use generic knowledge sources to infer if content in the moment data depicts "a cake cutting event," "an oath taking event," "an evening party," "a graduation walk," etc. The moment experience system 112 can use manually entered information, like the name of the venue, the schedule of an event (such as various sessions of a meeting or conference), and personal calendars of mobile device users to infer more information about moment data. The moment experience system 112 can use an automated clustering module to identify moment data that belongs to the same event, moment data that has been captured in a very small time span in a smaller geographic area.

The moment experience system 112 can use a combination of multiple sources of information because any one source of information might be noisy. For instance, inferring the content of an image by just using the pixel information may result in an erroneous inference. Therefore, the moment experience system 112 can use deep contextual reasoning to correctly infer an experience. The moment experience system 112 may use a set of rules which specify that certain inferences are practically incompatible with other inferences. For example, the moment experience system 112 may use pixel information to identify a photograph taken of clouds outside an airplane window, which may result in inferring a volcano and a wing as the content of the photograph, and tagging the photograph with the tags "volcano" and "wing." In this situation, the moment experience system 112 can use the barometer reading to infer that the mobile device is probably in a flight, use the geographic location sensor to infer that there are no volcanoes in the vicinity, and conclude that the content of the photograph depicts a wing, but not a volcano, and remove the tag "volcano" from the photograph. Similarly, the moment experience system 112 can use information from a geographic location sensor and reverse geocoding information to infer that the content identified in a photograph is an airport terminal, and not similarly appearing content for a bus station, subway station, or a train station. The moment experience system 112 can decrease the probable domain of all possible inferences associated with a moment to determine the most plausible inference.

After receiving geographic location information, time information, and contextual information, the moment experience system 112 creates a message about the moment data based on the geographic location information, the time information, and the contextual information, and possibly any derived values. For example, the moment experience system 112 residing on the smartphone 102 creates the message "Dancing with Tim at Jane's birthday party at Joe's Bar & Grill!" describing the photograph based on the photograph, the time information from the clock, the geographic information from the geographic location sensor, and the contextual information from the accelerometer and the calendar application, for the smartphone 102. Alternatively, the moment experience system 112 residing on the server 108 creates the message "Dancing with Tim at Jane's birthday party at Joe's Bar & Grill!" describing the photograph based on the photograph and geographic location information, the time information, and the contextual information received from the smartphone 102. If the moment experience system 112 uses the physiological sensors to determine the smartphone's user is in a happy mood, the moment experience system 112 can create the message "Dancing with Tim at Jane's birthday party Joe's Bar & Grill! #Happy", without the smartphone's user typing in anything. The information relevant to the moment data may be stored on the mobile devices 102-106 or the server 108, and may be referred to as "krumbs."

The moment experience system 112 can use a set of rules to infer the experiences of a moment. For example, if a location ontology indicates that a mobile device user is in a wilderness area and the accelerometer and the heart rate sensor indicate that the mobile device user is walking, the moment experience system 112 can create the message "Hiking at the Coyote Creek Park" to describe a photograph taken at that moment. In another example, if a location ontology indicates that a mobile device user is at Joe's Bar & Grill, the clock indicates noon, and the accelerometer that the mobile device user is sitting down, the moment experience system 112 can create the message "Eating lunch at Joe's Bar & Grill" to describe a photograph of food taken at that moment. Some of the rules may be expressed as a set of if-else statements, which can be formulated using generic knowledge about human behavior or using domain specific knowledge. The set of rules may be a function which can map various types of information to a semantically meaningful message, such as mapping the location, time, heart rate, weather sound, and various ontologies to semantically meaningful messages.

For every moment that is captured, the moment experience system 112 generates different inferences based on the different knowledge sources that contribute information for that moment. For example, given latitude and longitude, the moment experience system 112 may infer different types of locations, such as restaurants, residential areas, outdoors and recreations, arts and entertainment centers, colleges and universities, travel and transportation, community event areas, and professional/offices. Similarly, given the pixels of an image captured, the moment experience system 112 may infer different types of scene categories, such as pets and animals, buildings, people, outdoors, indoors, food, and text/signs. Examples of event ontologies include birthdays, graduations, weddings, anniversaries, religious events, and social events. Examples of activity ontologies include sitting, standing, walking, and running Each of these ontologies may be stored in any type of data structure, including hierarchical data structures such as trees. For example, the outdoor and recreation location type may have children types such as farms, campgrounds, national parks, forests, playgrounds, rivers, ski areas, etc. Similarly the scene category people may have children types such as selfies, groups, crowds, and babies. Therefore, the moment experience system 112 may access a set of knowledge trees instead of a set of flat level structures and combine multiple concept trees to create a natural language descriptive message of a moment experience.

Consequently, if the moment experience system 112 has access to K different knowledge sources (location, event, activity, emotion, etc.) with each knowledge source having N different values, then the total number of possible values is $N \times N \times N \ldots$ (K times)=$N^K$. Some of these possible values might be mutually incompatible. For example, the possibility of someone hiking in a professional indoor area is very low. Therefore, the moment experience system 112 may consider all of the possible values to identify the optimal value. The moment experience system 112 may use automated algorithms to efficiently search through the NAK spaces to identify the optimal values for a current experience. The moment experience system 112 may also evaluate probabilistic values for each individual outcome. Some of these probabilistic values can come from rule based knowledge and other probabilistic values could come from machine learning based models.

The moment experience system 112 can also help to select the most appropriate information for creating the correct natural language description of an event. The moment experience system 112 may infer multiple different inferences about an experience based on different information. For instance, the moment experience system 112 might infer that a mobile device user is walking in a wilderness area, on a windy day, during lunchtime, and the mobile device user's emotional state is surprise. The photograph that the corresponding mobile device took at that moment depicts a deer. The moment experience system 112 attempts to create the best possible natural language description of the moment, such as the possible messages "Wow! Saw a deer while hiking at Coyote Creek Park," "Walking during a windy day," "Surprised during lunchtime," and so on. The moment experience system 112 can automatically identify the best message using algorithmic rules. The moment experience system 112 may also enable a mobile device user to choose from a few different message options, and learn from the user's choices when creating subsequent messages. Thus, the moment experience system 112 can automatically create the best possible description of the moment with minimal user involvement.

The moment experience system 112 may rank individual knowledge sources. A photograph of a group of people in a restaurant at 10 A.M. can result in a message such as "Having breakfast with friends at XYZ restaurant," or "Enjoying pancakes during breakfast," or "With friends on a sunny Sunday morning at Castro Street in San Francisco." The moment experience system 112 may weigh the probability of each of these messages, and offer one or more of the messages to the user as selectable options. If the moment experience system 112 offers more than one message as an option, the user will be able to choose from these messages. The moment experience system 112 will be able to learn from past behavior of a user and better personalize the ranker. Thus, if a user has a preference for including family and friends in the past descriptive message, the moment experience system 112 will weigh people descriptions higher.

The mapping from various concepts to natural language description may be independent of any particular language. Thus, the descriptive message for a moment may not be limited to a population with a particular language. The moment experience system 112 can also generate various emojis for each concept. For example, the combination of an emoji for hiking and another emoji for love can convey the description "I love hiking " Since emojis and pictures are tools for messaging that can be understood by virtually everyone, the descriptive message for a moment may not be restricted to the literate population.

In addition to creating a message about moment data, the moment experience system 112 may receive augmented information from a user input associated with a mobile device. For example, the moment experience system 112 residing on the smartphone 102 receives the text "Wish U were here?" from the touchscreen of the smartphone 102.

Alternatively, the moment experience system 112 residing on the server 108 receives the text "Wish U were here?" from the smartphone 102.

After creating a message about moment data, the moment experience system 112 outputs the moment data with the message. For example, the moment experience system 112 residing on the smartphone 102 outputs the photograph taken at the party and the message "Dancing with Tim at Jane's birthday party at Joe's Bar & Grill! #Happy" and the text "Wish U were here?" to the social network friends of the smartphone's user. Alternatively, the moment experience system 112 residing on the server 102 outputs the photograph taken at the party and the message "Dancing with Tim at Jane's birthday party at Joe's Bar & Grill! #Happy" and the text "Wish U were here?" to the social network friends of the smartphone's user. The smartphone's user did not have to spend any time entering a message to describe the photograph as taken with Tim at Jane's birthday party at Joe's Bar & Grill. The smartphone's user just tapped the photo capture button on the smartphone 102 and the moment experience system 112 automatically created the correct descriptive message for the photograph.

The moment experience system 112 may output the moment data with the message to the mobile device and/or a remote computer in communication with the mobile device. For example, the moment experience system 112 may output the photograph and the automatically created message to the smartphone 102, so the smartphone's user can store the automatically created message with the photograph in the smartphone's photo album, and to the other smartphones 104 and 106, via a messaging or chat platform through email of one or more social networks, such as a social network specifically created for sharing moment experiences.

At the recipient side, the moment data may be received with all associated "krumbs" using a specialized protocol using extension "krm." The recipient's system interprets the "krm" format and renders the moment according to the settings used by the recipient. The rendering may consider a user's mobile device as well as his/her personal preferences for the media used when rendering the moment experienced.

Figure 2:
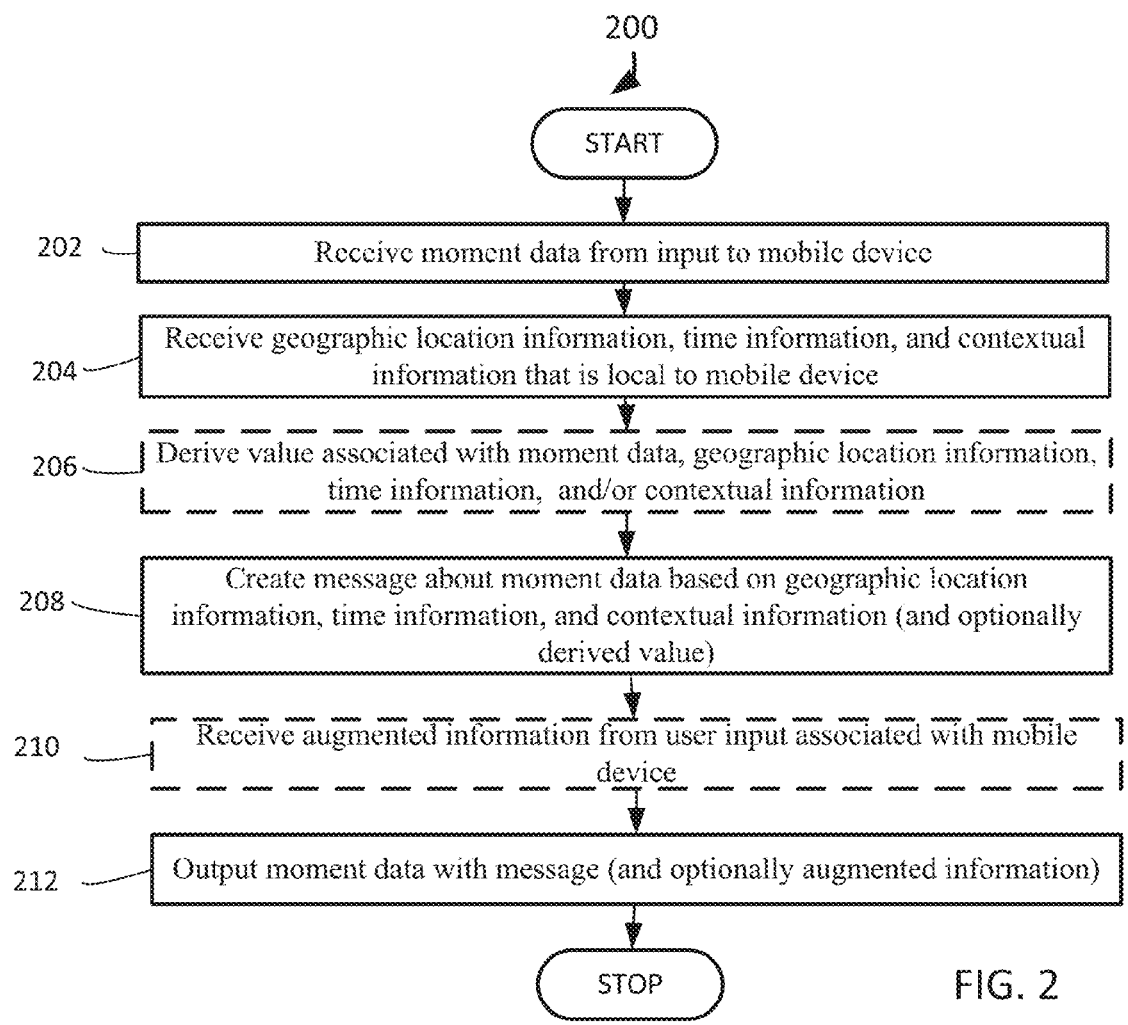
FIG. 2 is a flowchart that illustrates a computer-implemented method for sharing moment experiences, under an embodiment.

FIG. 2 is a flowchart that illustrates a computer-implemented method for sharing moment experiences, under an embodiment. Flowchart 200 illustrates method acts illustrated as flowchart blocks for certain actions involved in and/or between the system elements 102-108 of FIG. 2.

Moment data is received from an input to a mobile device, block 202. For example and without limitation, this may include the moment experience system 112 receiving a photograph taken by the smartphone's digital camera at a party.

After receiving a mobile device's moment data, geographic location information, time information, and contextual information that is local to the mobile device is received, block 204. By way of example and without limitation, this may include the moment experience system 112 receiving time information identifying the date and time as 9:00 PM Saturday May 9$^{th}$ from the clock residing on the smartphone 102, receiving contextual information from the accelerometer residing on the smartphone 102 which indicates that the smartphone's user is dancing, and receiving contextual information identifying a calendar entry for attending Jane's birthday party at 9:00 P.M. on May 9$^{th}$ from the calendar application residing on the smartphone 102.

After receiving geographic location information, time information, and contextual information, a value associated with the moment data, the geographic location information, the time information, and/or the contextual information is optionally derived, block 206. In embodiments, this may include the moment experience system 112 using facial detection and recognition software to identify Tim in the photograph, and using geographic information from the smartphone's geographic location sensor combined with derived values from reverse geocoding information to identify the location of Jane's birthday party as Joe's Bar & Grill.

After receiving geographic location information, time information, and contextual information, a message is created about the moment data based on the geographic location information, the time information, and the contextual information, block 208. For example and without limitation, this may include the moment experience system 112 creating the message "Dancing with Tim at Jane's birthday party at Joe's Bar & Grill!" describing the photograph based on the photograph, the time information from the clock, the geographic information from the geographic location sensor, and the contextual information from the accelerometer and the calendar application, residing on the smartphone 102.

In addition to creating a message about moment data, augmented information is optionally received from a user input associated with a mobile device, block 210. By way of example and without limitation, this may include the moment experience system 112 receiving the text "Wish U were here?" from the touchscreen of the smartphone 102.

After creating a message about moment data, the moment data is output with the message, block 212. In embodiments, this may include the moment experience system 112 outputting the photograph taken at the party and the message "Dancing with Tim at Jane's birthday party at Joe's Bar & Grill!" and the text "Wish U were here?" to the social network friends of the smartphone's user. The smartphone's user did not have to spend any time entering a message to describe the photograph as taken with Tim at Jane's birthday party at Joe's Bar & Grill.

Although FIG. 2 depicts the blocks 202-212 occurring in a specific order, the blocks 202-212 may occur in another order. In other implementations, each of the blocks 202-212 may also be executed in combination with other blocks and/or some blocks may be divided into a different set of blocks.

Figure 3:
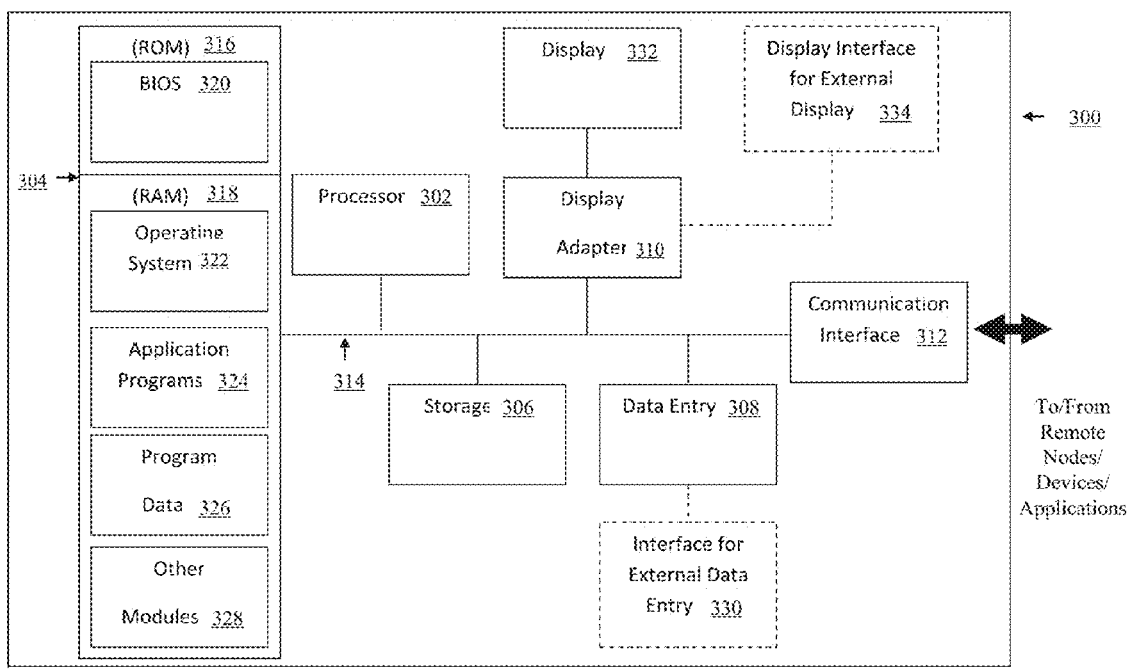
FIG. 3 is a block diagram illustrating an example hardware device in which the subject matter may be implemented.

An exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, a memory 304, a storage 306, a data entry module 308, a display adapter 310, a communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include a read only memory (ROM) 316 and a random access memory (RAM) 318. The memory 304 may be configured to store program instructions and data during operation of the hardware device 300.

In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVDTM), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via the external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for sharing moment experiences, the system comprising:
   one or more processors; and
   a non-transitory computer readable medium storing a plurality of instructions, which
when executed, cause the one or more processors to:
   receive moment data from an input to a mobile device;
   receive geographic location information, time information, and contextual information that is local to the mobile device, the contextual information being received prior to receiving the moment data;
   identify an image in the moment data:
   create a message about the moment data based on the geographic location information, the time information, the image identified in the moment data, and the contextual information; and
   output the moment data with the message to at least one of the mobile device and a remote computer in communication with the mobile device.

2. The system of claim 1, wherein the input to the mobile device comprises at least one of a digital camera, an audio input, a touchscreen, a keyboard, a touchpad, a mouse input device; and wherein the mobile device comprises at least one of a mobile phone, a tablet computer, a laptop computer, a portable computer, a wearable computer, a dual mode handset, a dual subscriber identification module phone, a wireless mobile device, a pager, a personal digital assistant, a digital video player, a digital camera, a digital music player, a digital calculator, and an electronic key fob for keyless entry.

3. The system of claim 1, wherein the contextual information comprises information from at least one of an accelerometer, an electronic gyroscope, a barometer, a galvanic skin response sensor, a heart rate monitor, a skin temperature sensor, a respiration rate sensor, a piezoelectric pulse wave blood pressure sensor, a skin conductivity sensor, and a software application associated with the mobile device.

4. The system of claim 1, wherein one of the mobile device and a remote computer in communication with the mobile device receives the moment data; receives the geographic location information, the time information, and the contextual information; creates the message about the moment data; and outputs the moment data with the message.

5. The system of claim 1, wherein the plurality of instructions, when executed, will further cause the one or more processors to derive a value associated with at least one of the moment data, the geographic location information, the time information, and the contextual information, wherein creating the message about the moment data based on the geographic location information, the time information, and the contextual information comprises creating the message about the moment data based on the geographic location information, the time information, the contextual information, and the derived value.

6. The system of claim 1, wherein the plurality of instructions, when executed, will further cause the one or more processors to receive augmented information from a user input associated with the mobile device, wherein outputting the moment data with the message comprises outputting the moment data with the message and the augmented information.

7. A computer-implemented method for sharing moment experiences, the method comprising:
   receiving moment data from an input to a mobile device;
   receiving geographic location information, time information, and contextual information that is local to the mobile device, the contextual information being received prior to receiving the moment data;
   identifying an image in the moment data:
   creating a message about the moment data based on the geographic location information, the time information, the image identified in the moment data, and the contextual information; and
   outputting the moment data with the message to at least one of the mobile device and a remote computer in communication with the mobile device.

8. The computer-implemented method of claim 7, wherein the input to the mobile device comprises at least one of a digital camera, an audio input, a touchscreen, a keyboard, a touchpad, a mouse input device; and wherein the mobile device comprises at least one of a mobile phone, a tablet computer, a laptop computer, a portable computer, a wearable computer, a dual mode handset, a dual subscriber identification module phone, a wireless mobile device, a pager, a personal digital assistant, a digital video player, a digital camera, a digital music player, a digital calculator, and an electronic key fob for keyless entry.

9. The computer-implemented method of claim 7, wherein the contextual information comprises information from at least one of an accelerometer, an electronic gyroscope, a barometer, a galvanic skin response sensor, a heart rate monitor, a skin temperature sensor, a respiration rate sensor, a piezoelectric pulse wave blood pressure sensor, a skin conductivity sensor, and a software application associated with the mobile device.

10. The computer-implemented method of claim 7, wherein one of the mobile device and a remote computer in communication with the mobile device receives the moment data; receives the geographic location information, the time information, and the contextual information; creates the message about the moment data; and outputs the moment data with the message.

11. The computer-implemented method of claim 7, wherein the method further comprises deriving a value associated with at least one of the moment data, the geographic location information, the time information, and the contextual information, wherein creating the message about the moment data based on the geographic location information, the time information, and the contextual information comprises creating the message about the moment data based on the geographic location information, the time information, the contextual information, and the derived value.

12. The computer-implemented method of claim 7, wherein the method further comprises receiving augmented information from a user input associated with the mobile device, wherein outputting the moment data with the message comprises outputting the moment data with the message and the augmented information.

13. A computer program product, comprising a non-transitory computer-readable medium having a computer-readable program code embodied therein to be executed by one or more processors, the program code including instructions to:
  receive moment data from an input to a mobile device;
  receive geographic location information, time information, and contextual information that is local to the mobile device, the contextual information being received prior to receiving the moment data;
  identify an image in the moment data;
  create a message about the moment data based on the geographic location information, the time information, the image identified in the moment data, and the contextual information; and
  output the moment data with the message to at least one of the mobile device and a remote computer in communication with the mobile device.

14. The computer program product of claim 13, wherein the input to the mobile device comprises at least one of a digital camera, an audio input, a touchscreen, a keyboard, a touchpad, a mouse input device; wherein the mobile device comprises at least one of a mobile phone, a tablet computer, a laptop computer, a portable computer, a wearable computer, a dual mode handset, a dual subscriber identification module phone, a wireless mobile device, a pager, a personal digital assistant, a digital video player, a digital camera, a digital music player, a digital calculator, and an electronic key fob for keyless entry; and wherein the contextual information comprises information from at least one of an accelerometer, an electronic gyroscope, a barometer, a galvanic skin response sensor, a heart rate monitor, a skin temperature sensor, a respiration rate sensor, a piezoelectric pulse wave blood pressure sensor, a skin conductivity sensor, and a software application associated with the mobile device.

15. The computer program product of claim 13, wherein one of the mobile device and a remote computer in communication with the mobile device receives the moment data; receives the geographic location information, the time information, and the contextual information; creates the message about the moment data; and outputs the moment data with the message.

16. The computer program product of claim 13, wherein the program code includes further instructions to derive a value associated with at least one of the moment data, the geographic location information, the time information, and the contextual information, wherein creating the message about the moment data based on the geographic location information, the time information, and the contextual information comprises creating the message about the moment data based on the geographic location information, the time information, the contextual information, and the derived value.

17. The computer program product of claim 13, wherein the program code includes further instructions to receive augmented information from a user input associated with the mobile device, wherein outputting the moment data with the message comprises outputting the moment data with the message and the augmented information.

* * * * *